Dec. 23, 1958    K. R. MATZ    2,866,112
BRUSH CAP CONNECTION
Filed Nov. 17, 1955
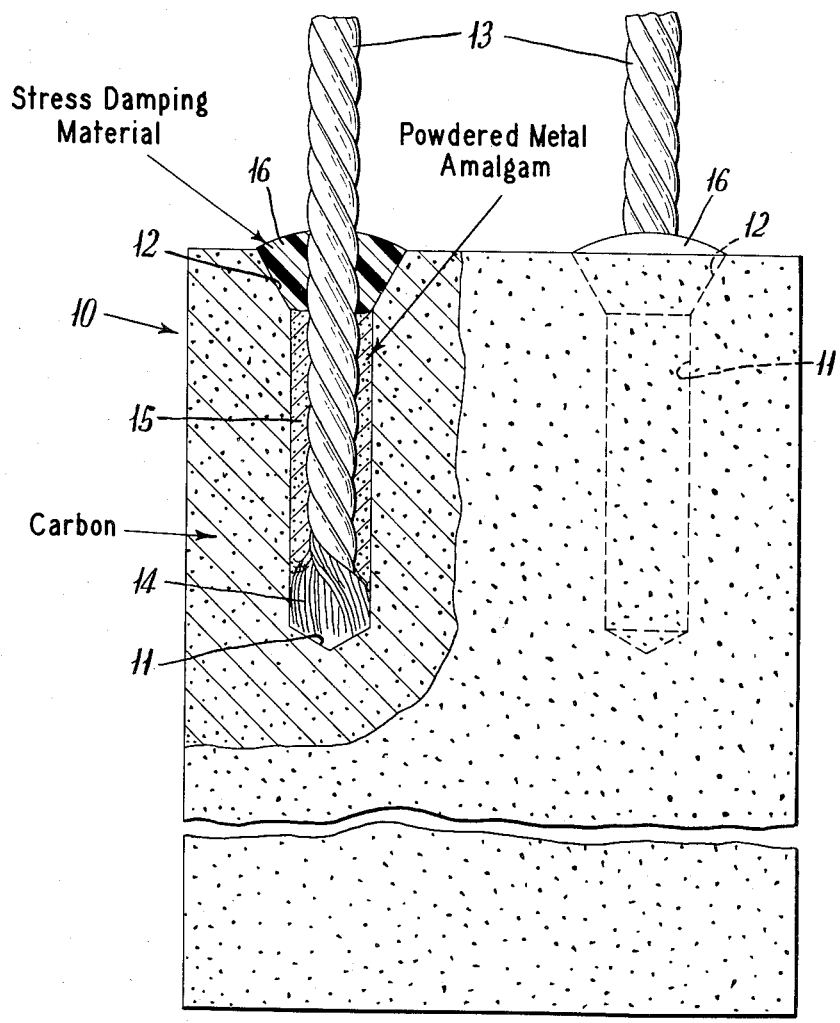
INVENTOR.
KENNETH R. MATZ
BY Herbert J. Evers
ATTORNEY

2,866,112

BRUSH CAP CONNECTION

Kenneth R. Matz, Cleveland, Ohio, assignor to Union Carbide Corporation, a corporation of New York Application November 17, 1955, Serial No. 547,430

3 Claims. (Cl. 310—249)

This invention relates to improvements in brush connections, and more particularly concerns improved means for prolonging the useful life of a cable connection in an electrical contact brush.

In connecting a cable or shunt to an electrical contact brush, the cable end is usually held in a cavity in the brush by powdered metal or amalgam or other cementitious material which is tamped around the cable inside the cavity. Sometimes the brush cavity is sealed with a hard phenolic cement cap to prevent the falling out of loose material. In using such a connection, there is a tendency for the cable to bend at the point where it enters the brush, particularly when such a connection is subject to vibration. As a result, the cable frequently breaks at the point where it enters the brush due to vibration fatigue or fatigue bending.

It is, therefore, an important object of the present invention to provide an improved connection for prolonging the useful life of cable connectors. Another object is the provision of improved means for minimizing the effects of vibration on the electrical cable at the point where it enters the brush.

These objects are accomplished in the present invention by inserting one end of the cable in a cavity in the brush, and partially filling the cavity with a cementitious material, space being left in the region where the cable emerges from the cavity. The remaining portion of the cavity is then filled with a cementitious material which is somewhat elastically yieldable, so that the bending stresses in this section of the cable are reduced or distributed over a greater section, thereby substantially decreasing the tendency for cable failure by fatigue bending.

Among the advantages of a brush equipped with an elastically yieldable cementitious filling material according to the invention is the protection of the cable connection from vibration fatigue at the point where it enters the brush cavity. The elastic yieldability of the filling material of the invention cushions vibrations transmitted through the brush cable, and at the same time retains the cable end in position relative to the brush to resist movement which tends to shorten cable fatigue life.

Other advantages which accrue from the use of the brush cable connection of the present invention lie in the protection of the amalgam or cementitious connection in the lower part of the brush cavity. The improved brush cable connection of the present invention also affords a protective resilient cap over the amalgam connection, and prevents the shaking out of this material, should it become loose.

In the drawing:

The single figure is an elevational view, partly in section, of a brush connection assembled in accordance with the principles of the present invention.

Referring to the drawing, an electrical contact brush 10 made of carbon, graphite, or metal-graphite is provided with an elongated cylindrical blind end opening or cavity 11 having a chamfered entrance 12. A copper or other electrically conductive cable 13 having an end portion 14 slightly smaller in diameter than the diameter of the cavity 11 may be loosely received therein to form an electrical connection. For securely holding the cable end 14 in the brush cavity 11, and for making a good electrical contact, powdered metal amalgam or other suitable electrically conductive cementitious material 15 having high strength and heat resistant characteristics may be provided around the cable inside the cavity as shown in the drawing. Only a portion of the cavity is so filled, space being left at the chamfered section 12 of the opening 11 to receive the sealing material of the invention.

According to the present invention, bending stresses which normally concentrate at the line of joinder between the electrical shunt and the outer surface of a contact brush are minimized in magnitude by distributing the undesirable bending stresses over a greater portion of the connecting shunt. This is accomplished in the present invention by sealing the brush cavity with a cementitious material having a sufficient degree of hardness to firmly grip the cable, yet having a sufficient yieldability or "give" against which the cable may bear.

As shown in the drawing, the chamfered portion 12 of the brush cavity 11 is filled with an eyelet grommet of suitable cementitious material 16, having desirable resilient and adherent properties for damping vibration and generally improving cable fatigue life. Suitable materials are those having a Durometer hardness between 15 and 100 based on ASTM method D-785. The preferred range of Durometer hardness is between 75 and 85.

Thermosetting resins such as epoxy type resins which have been rendered pliable by the addition of plasticizers have been found to substantially extend cable fatigue life in brush connections made in accordance with the principles of the invention. An example of one such material having an epoxy resin structure which is admirably suited for use in the brush cap connection of the present invention is one prepared from di-glycidyl ether of bis-phenol F. This ether has the following structural formula:

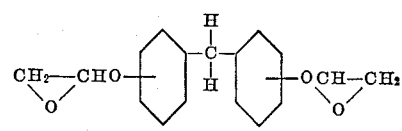

Another material which may be satisfactorily employed in the practice of the invention comprises a synthetic rubber-like sealing material, which elastically yields when pressure is brought to bear upon it. Excellent results are obtained when a liquid polymer consisting of sulfur-containing mercaptans having terminal thiol groups is used.

Such sulfur-bearing thiol chemicals and polymers are generally made from polysulfide resins and rubbers which are first formed by the reaction of organic dihalides with a polysulfide. These polysulfide polymers are then reduced, as by hydrogenolysis, to cleave some of the disulfide linkages to form lower molecular weight liquid polymers or chemicals having terminal thiol groups. For forming one group of such reduced polysulfide resins of low viscosity, dichloroethyl formal is reacted with sodium polysulfide, although other organic halides may be substituted therefor, such as ethylene dichloride, propylene dichloride, dichloroethyl ether, and triethylene glycol dichloride.

Depending on the degree of reduction and on the molecular weight of the starting polysulfide resins, the liquefied polymers may be different average molecular weights varying, as in the case of the polymers from dichloroethyl formal, from about 168 to about 4000 and having corresponding viscosities from 0.5 to 450 poises.

The preferred sealing composition to be used in the practice of the invention is as follows:

| Material: | Parts by weight |
|---|---|
| Epoxy resin (di-glycidyl ether of bis-phenol liquid polysulfide polymer) | 54.7 |
| Epoxy resin (di-glycidyl ether of bis-phenol F) | 27.4 |
| Finely milled quartz flour | 16.5 |
| Catalyst (tri-dimethylamino-methyl phenol) | 1.4 |
| | 100.0 |

In preparing the brush-cable connection of the invention using the above thermosetting resinous material to replace the conventional hard phenolic cap, the chamfered portion 12 of the brush cavity is filled to a point flush with or slightly overflush to the brush surface. The resinous material is then hardened in situ by heat curing until maximum bond strength is obtained, the temperature and duration of heat treatment being determined in part by the specific resinous material applied.

The effectiveness of brush connections embodying the principles of the present invention in reducing the harmful consequence of fatigue bending at the cable-sealing material interface is apparent from the data shown in Table I.

TABLE I

*Effect of cementing material on minimum fatigue life of copper cable connectors*

| Cementing Material | Minimum Cable Fatigue Life (Millions of Vibrations) |
|---|---|
| A (control) | 2.4 |
| B | 7.9 |
| C | 10.5 |
| D | 25.0 |

A = Amalgam.
B = Epoxy resin (di-glycidyl ether of bis-phenol F).
C = Polythiol composition (mercaptan-terminated liquid polysulfide polymer).
D = 54.7 parts "C," 27.4 parts "B," 16.5 parts finely milled quartz flour, and 1.4 parts tri-dimethylaminomethyl phenol.

From the above table it will be seen that the fatigue life of cables in brush connections employing the resilient sealing material of the invention show an increase of fatigue life between 3.3 and 10.4 times over the fatigue life of conventionally connected brush cables.

It should be noted that although the above results apply to brush connections in which the capping materials were bonded to the cable connectors, the excellent results obtained are not dependent upon the capping material being bonded to the cable, but apply equally well to capping materials in the form of eyelet grommets having the requisite elasticity for damping vibration and lengthening fatigue endurance of the cable connector.

It will, of course, be understood that while the cavity region for receiving the elastically yieldable sealing material is shown as chamfered, other forms of depressions may be used. For instance, suitable recesses may be provided in the chamfered portion of the cavity so as to interlockingly retain the sealing material in assembly. In addition, it is to be noted that the use of the specific materials is specified herein only for illustration and any equivalent material having the requisite elastic, electrical and cementing properties, and capable of withstanding the vibrations and heat influences to which the instant connection is subjected, may be employed in the practice of the invention.

What is claimed is:

1. In an electrical contact brush having a cavity for the reception of an electrically conductive cable and a mass of hard cementitious material compacted into said cavity around said cable, the combination therewith of an improved cementitious material, for reducing the development of excessive bending stresses and fatigue failure caused by the vibrations at the point where the cable enters the brush, comprising mercaptan-terminated liquid polysulfide polymer, di-glycidyl ether of bis-phenol F, quartz flour, and tri-dimethyl-aminomethyl phenol, said improved material being in said cavity in the region where said cable enters the brush and adapted to substantially reduce shaking out of said hard cementitious material from said cavity and to simultaneously damp said vibrations, thereby extending the useful life of said cable.

2. A cementitious resinous material adapted for use as a capping and vibration damping material in an electrical contact brush cavity, and characterized by elastic yieldability and prepared from a composition consisting of 54.7 parts mercaptan terminated liquid polysulfide polymer, 27.4 parts diglycidyl ether of bis-phenol F, 16.5 parts quartz flour, and 1.4 parts tri-dimethylaminomethyl phenol.

3. In an electrical contact brush having a cavity for the reception of an electrically conductive cable and a mass of hard cementitious material compacted into said cavity around said cable, the combination therewith of an improved cementitious material, for reducing the development of excessive bending stresses and fatigue failure caused by vibrations at the point where the cable enters the brush, comprising 54.7% mercaptan-terminated liquid polysulfide polymer, 27.4% di-glycidyl ether of bis-phenol F, 16.5% quartz flour, and the remainder tri-dimethylaminomethyl phenol, said improved material being in said cavity in the region where said cable enters the brush and adapted to substantially reduce shaking out of said hard cementitious material from said cavity and to simultaneously damp said vibrations, thereby extending the useful life of said cable.

References Cited in the file of this patent

UNITED STATES PATENTS

| 1,453,793 | Hamister | May 1, 1923 |
| 1,959,848 | Abbott | May 22, 1934 |
| 2,631,252 | Falcettoni | Mar. 10, 1953 |
| 2,640,943 | Roberts | June 2, 1953 |
| 2,658,130 | Bondurant | Nov. 3, 1953 |
| 2,682,515 | Naps | June 29, 1954 |

OTHER REFERENCES

Jorczak et al.: India Rubber World, April 1954, pp. 66–69.

Jorczak et al.: Industrial and Engineering Chemistry, vol. 43, February 1951, pp. 324–328.

UNITED STATES PATENT OFFICE

CERTIFICATE OF CORRECTION

Patent No. 2,866,112                                              December 23, 1958

Kenneth R. Matz

It is hereby certified that error appears in the printed specification of the above numbered patent requiring correction and that the said Letters Patent should read as corrected below.

Column 3, lines 4 and 5, strike out "Epoxy resin (di-glycidyl ether of bis-phenyl liquid polysulfide polymer)" read --- Polythiol composition (Mercaptan-terminated Liquid Polysulfide Polymer) ---. .

Signed and sealed this 7th day of April 1959.

(SEAL)
Attest:
KARL H. AXLINE
Attesting Officer

ROBERT C. WATSON
Commissioner of Patents